Figure 5:
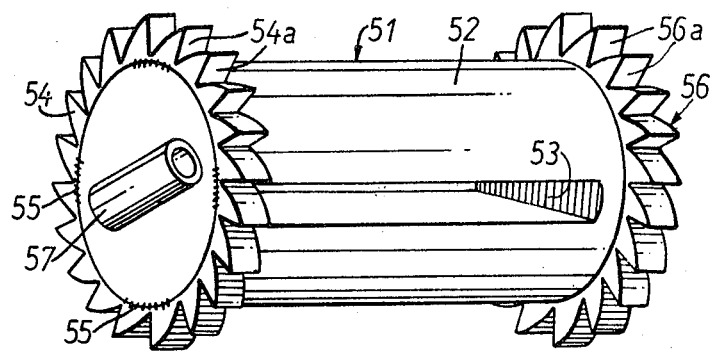

United States Patent [19]

Richmond

[11] 4,428,099
[45] Jan. 31, 1984

[54] TENSIONING APPARATUS

[76] Inventor: Raymond Richmond, 1a, Barley Hill La., Garforth, Leeds, England, LS25 1DX

[21] Appl. No.: 317,368

[22] Filed: Nov. 2, 1981

[30] Foreign Application Priority Data

Oct. 17, 1980 [GB] United Kingdom .............. 8033520

[51] Int. Cl.³ .......................................... A44B 21/00
[52] U.S. Cl. ......................... 24/68 CD; 24/68 R; 24/68 B; 24/265 R; 24/265 CD; 242/74; 410/100; 410/103
[58] Field of Search ............ 24/68 BT, 68 CD, 68 B, 24/68 D, 68 R, 68 Z, 65 C, 265 R, 265 CD; 242/74; 410/100, 103

[56] References Cited

U.S. PATENT DOCUMENTS

| | | | |
|---|---|---|---|
| 3,225,408 | 12/1965 | Durham | 24/265 R |
| 3,291,416 | 12/1966 | Gionta | 242/74 |
| 3,848,889 | 11/1974 | Sharrow | 410/103 |
| 3,856,265 | 12/1974 | Foster | 24/68 R |
| 3,881,694 | 5/1975 | Gardner | 24/68 R |
| 3,884,450 | 5/1975 | Brammer | 24/68 R |
| 4,045,002 | 8/1977 | Miller | 24/68 CD |
| 4,119,281 | 10/1978 | Paitula et al. | 242/74 |
| 4,243,350 | 1/1981 | Hall | 410/103 |

FOREIGN PATENT DOCUMENTS 2081802 2/1982 United Kingdom .............. 24/68 R

*Primary Examiner*—Robert A. Hafer
*Assistant Examiner*—Paul S. Polakowski
*Attorney, Agent, or Firm*—William A. Drucker

[57] ABSTRACT

The invention relates to a tensioning apparatus for tensioning a flexible member, such as a strap (11, 62) or a panel (P) and wherein the flexible member (11, 62, P) presents a rigid element (13) at or near its free end or edge, the rigid insert (13) is located in a slot (15, 53) in a rotary member (16, 51) and said rotary member (16, 51) is rotated to tension the flexible member (11, 62, P). The apparatus includes locking means (21, 22 or 54, 56, 64 and 65) for locking the rotary member (16, 51) with the flexible member (11, 62 or P) in tension and said flexible member (11, 62, P) preferably includes a resilient member (14) which, when passed through the slot (15, 53) in advance of the rigid element (13) resiliently retains the flexible member (11, 62, P) with the rotary member (16, 51). The slot (15, 53) in the rotary member (16, 51) may receive two or more flexible members (11, 62, or P) and/or said rotary member (16, 51) may include more than one slot (15, 53) each of which may receive one or more flexible members (11, 62, P).

10 Claims, 6 Drawing Figures

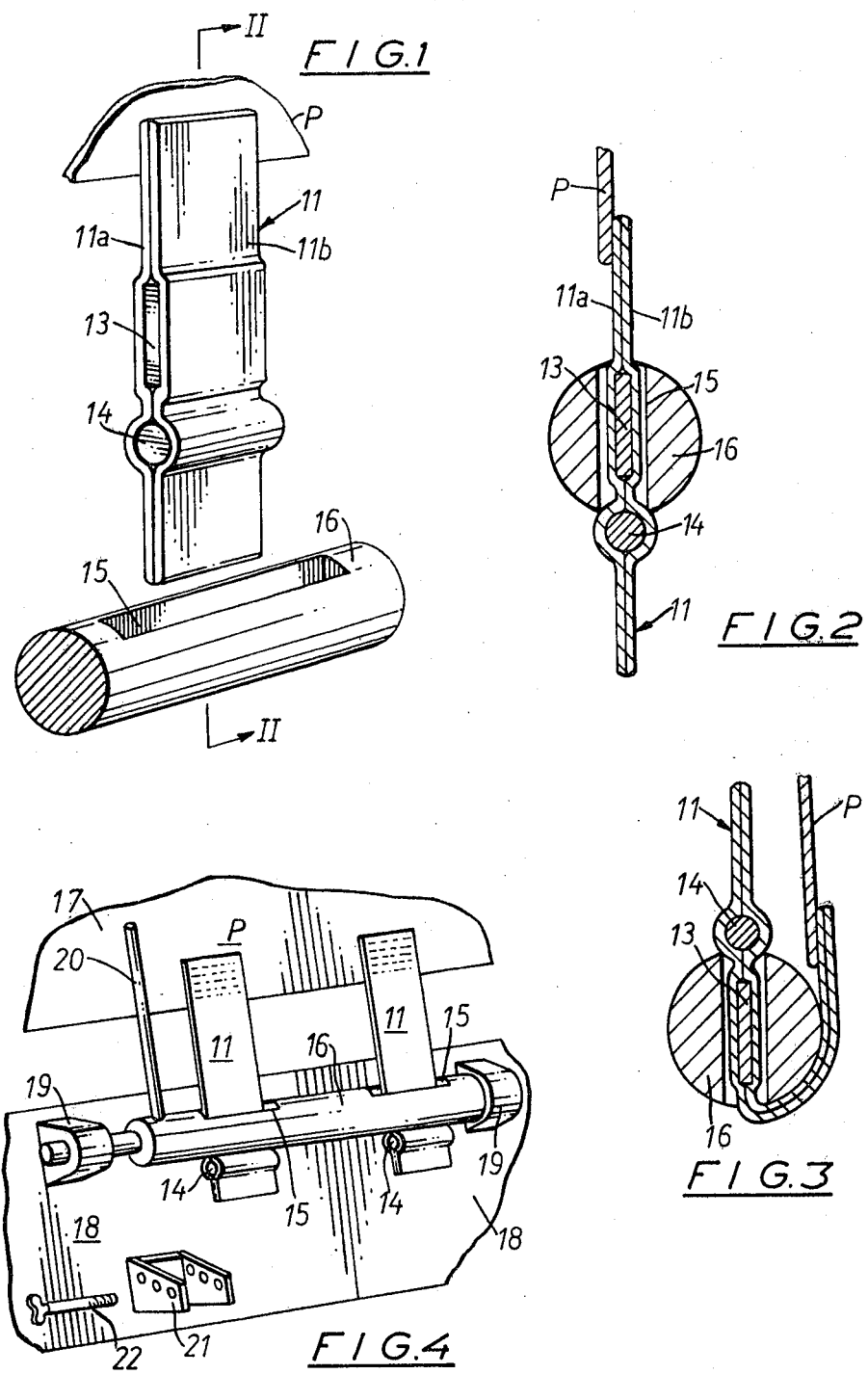

TENSIONING APPARATUS

BACKGROUND OF INVENTION (a) Field of the Invention

This invention relates to a tensioning apparatus and, more particularly, to a tensioning apparatus for tensioning a flexible member having a width greater than its thickness and which has one end anchored and one free end to be engaged by the tensioning apparatus.

(b) Description of Prior Art

There are many forms of tensioning apparatus for tensioning flexible members such as ropes or cables but such devices as winches and capstans require that end of the flexible member remote from the anchored end to be permanently secured to the rotary drum of the apparatus or a plurality of turns of the flexible member (generally more than 3) engaged with the rotary drum to establish a frictional engagement with the drum of the tensioning apparatus. Thus, such prior art drum devices cannot be used when the flexible member cannot be permanently attached to the drum of the tensioning apparatus, or when the flexible member does not have sufficient spare length to achieve the desired number of turns, or when the flexible member has such width relative to its thickness that it cannot conveniently have the number of turns applied to the drum to achieve the desired frictional engagement.

Thus, the conventional devices for tensioning a flexible member having a width greater than its thickness and which cannot be permanently attached to the tensioning apparatus comprise different forms of buckles into which the flexible member is threaded.

A particular problem exists when tensioning a flexible panel, such as a flexible side wall for a motor vehicle which is normally anchored along its upper edge to a rigid roof part of the vehicle and has its lower edge detachably secured to a rigid lower region of the vehicle, generally the side of the load bearing platform of the vehicle, to contain and protect the load. It is important that such flexible walls be tensioned uniformly to avoid flapping which, apart from being visually distracting, can adversely affect the containment of the load and thereby the safety of the vehicle and its load, and the performance of the vehicle.

One prior art method for securing such a flexible side wall comprises lacing the lower edge of the flexible wall to the rigid part of the vehicle with a length of rope, a time taking and tedious task the efficiency of which is entirely dependent upon the skill of the operator and as the rope is exposed to the elements the said rope can shrink or stretch after the initial tensioning, whereby the tension in the flexible wall can vary considerably to the detriment of the wall and/or the containment of the load.

In an alternative prior art arrangement for securing such a flexible wall the lower edge regions of the flexible wall are secured to the rigid part of the vehicle by a plurality of strap and buckle arrangements, spaced apart along the length direction of the flexible wall. This arrangement suffers from the disadvantages that the securement of the plurality of strap and buckle arrangements is a time taking and tedious operation, particularly uncomfortable in adverse weather conditions, and as each strap and buckle arrangement is tensioned individually the tension in the flexible wall can vary along the length of the wall, thereby permitting flapping of the wall when the vehicle is travelling.

STATEMENT OF INVENTION

According to the present invention there is provided a tensioning apparatus, for tensioning a flexible member anchored at one end, comprising a rotary member arranged for rotation about an axis parallel to the intended plane of tension for the flexible member and at right angles to the intended direction of tensioning, means for rotating said rotary member to wind said flexible member onto said rotary member to tension said flexible member, and means for locking said rotary member with the flexible member under tension, and wherein the rotary member includes a slot extending in the direction of the said axis, a rigid element is secured to the flexible member, the slot has such width as to allow the free end of the flexible member to be entered thereinto and drawn through the rotary member until the rigid element lies within said slot, and said rigid element has such length, in the direction of its insertion into the slot, and the slot has such depth, that the rigid element is locked in the slot when the plane of the slot is rotated through more than 90° from the intended plane of tension for the flexible member and the said flexible member is in tension.

In this specification the "length" of the slot is the dimension of the slot in the direction of the axis of the rotary member, the "width" of the slot is the distance between the two surfaces defining the slot, and the "depth" of the slot is that dimension of the two surfaces defining the slot at right angles to the axis of the rotary member.

The advantages offered by the present invention are mainly that the free end of the flexible member can be quickly and readily inserted into the slot of the rotary member, so that no permanent connection between the flexible member and the rotary member is necessary, the rigid element, and thereby the flexible member, is locked with the rotary member once the rotary member has rotated the plane of the rigid member through more than 90° from the intended plane of tension for the flexible member, and the tensioning of the flexible member is not dependent on the number of turns of the flexible member on the rotary member. Thus, a rapid engagement and tensioning of the flexible member is possible.

Preferably the rigid element comprises a metal plate and, conveniently, the flexible member comprises two panels secured together in face-to-face relationship with the rigid member secured between said panels.

In one embodiment in accordance with the invention the slot in the rotary member may have such length as to be capable of receiving more than one flexible member in spaced apart relationship but in another embodiment of the invention the rotary member has a plurality of slots, spaced apart in the direction of axis of the rotary member, and each of said slots is capable of receiving a flexible member, or a plurality of flexible members in side-by-side relationship, each flexible member presenting a rigid element engageable with the slot. Thus, by this means a plurality of flexible members can be tensioned simultaneously.

The means for rotating the rotary member, to tension the flexible member or members, may conveniently comprise a radial lever fixed with, or detachably secured to, the rotary member.

Preferably the means for locking the rotary member, with the flexible member or members in tension, comprise a keep engageable with said radial lever but in an alternative arrangement a ratchet wheel, or ratchet wheels, are secured with the rotary member and the means for locking the rotary member comprise a pawl engageable with the, or each, ratchet wheel.

Preferably the, or each, flexible member includes a resilient body, adjacent the rigid element and towards the free end of the flexible member so as to precede the rigid element when the flexible member is being inserted into the slot of the rotary member, the resilient body having such dimensions as to be resiliently deformed in passage through the slot whereupon, on clearing said slot, the resilient member returns to its normal shape and configuration to temporarily anchor the respective flexible member with the rotary member and, further, when engaged with the rotary member after passage through said slot, to locate the rigid element correctly within the slot in the rotary member.

The tensioning apparatus proposed by the present invention has particular application to the tensioning of a flexible panel and, when the rotary member can have a single slot greater than the length of the free edge region of the panel, the flexible member may comprise the panel, but when the slot in a single rotary member cannot accommodate the free edge of the panel the flexible members may comprise a plurality of straps, each anchored at one end to the flexible panel as by stitching, spaced apart along the free edge of the panel and the straps may be tensioned simultaneously by a single tensioning apparatus or be tensioned in groups by a plurality of tensioning apparatuses spaced apart in the direction of the free edge of the panel and preferably with their axes lying on a common axis.

The invention will now be described further by way of example with reference to the accompanying drawings in which:

FIG. 1 shows, in perspective view, a tensioning apparatus in accordance with the invention, FIG. 2 shows the arrangement of FIG. 1, in cross-section on the line II—II, with the flexible Member entered into the rotary member and anchored, but not tensioned.

Figure 6:
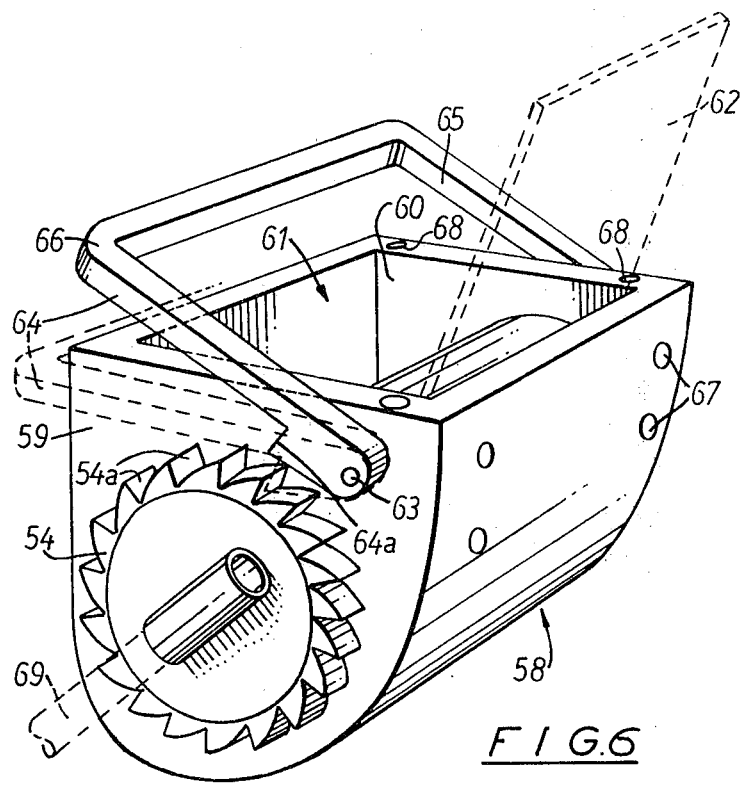

FIG. 3 shows a cross-section, similar to FIG. 2, but with the rotary member in a position to tension the flexible member, FIG. 4 shows, in perspective view, a tensioning arrangement in accordance with the invention for tensioning part of a flexible wall, FIG. 5 shows, in perspective view, an alternative rotary member construction and, FIG. 6 shows, in perspective view, a winch arrangement utilizing the rotary member shown in FIG. 5.

In the arrangement illustrated in FIG. 1 a flexible member 11 has one end region secured, as by stitching, to an anchor member which may, conveniently, comprise a flexible wall or panel P. The flexible member 11 comprises two panels 11a and 11b secured together in face-to-face relationship with a rigid element 13, and a resilient body 14, secured between panels 11a, 11b. As will be seen from FIG. 1 the resilient body 14, which may comprise a cylinder of rubber, is towards the free end of the member 11 and the rigid insert 13, conveniently a steel plate, is spaced from the resilient body 14 towards the anchored end of member 11.

The member 11 is intended to be inserted into a slot 15 in a rotary member 16, the slot 15 has a width slightly less than the undeformed width of the resilient body 14 plus the thickness of panels 11a, 11b so that, when the free end of the member 11 is inserted into the slot 15 and drawn therethrough the resilient body 14 is compressed, in the width direction, to enter and pass through the slot 15. When the resilient body 14 has been pulled out of the lower regions of slot 15 said body returns to its unstressed condition and, as will be seen from FIG. 2, resiliently anchors the flexible member 11 to the rotary member 16.

It will be observed that for all conditions when the resilient body 14 is resiliently anchoring the flexible member 11 with the rotary member 16 the rigid insert 13 lies within the slot 15 and the depth of the rigid insert in said slot 15 is greater than the width of slot 15.

From the position illustrated in FIG. 2, and wherein the flexible member 11 is untensioned and resiliently anchored to the rotary member 16, the rotary member 16 can be rotated through 180° to the position illustrated in FIG. 3. As the member 16 rotates from the position shown in FIG. 1 the rigid member 13 is rotated therewith, when the plane of the member 13 passes through an angle of more than 90° to the tension plane of the flexible member 11 the member 13 is locked in slot 15 and, in rotating further, part of the flexible member 11 is wound onto the rotary member 16, thus tensioning the flexible member 11.

The arrangement illustrated in FIG. 4 is particularly suitable for anchoring and tensioning a flexible side wall 17 for a vehicle, the upper edge of the side wall being anchored to a rigid part of the vehicle and the lower regions having flexible members 11 secured thereto, as by stitching, in spaced apart relationship along said edge region. A lower rigid part 18 of the vehicle presents bearings 19 for a rotary member 16 having two slots 15 therethrough, the slots 15 being spaced apart in the axial direction of rotary member 16 by an amount equal to the spacing of the members 11 on the flexible wall 17.

The rotary member 16 includes a radial lever 20 by which the rotary member 16 can be manually rotated and the rigid part 18 of the vehicle presents a keep 21 into which the lever 20 can be rotated and maintained by keep pin 22.

Each of the members 11 is identical with the construction of member 11 illustrated in FIGS. 1, 2 and 3 of the embodiment and, thereby, each member 11 includes a rigid insert 13 and a resilient insert 14.

With the FIG. 4 embodiment, and to tension the flexible wall 17, the rotary member 16 is first rotated, using the lever 20, until the lever 20 is substantially vertical, when the planes of the slots 15 will also be substantially vertical. With the rotary member 16 in this position the lower region of each flexible member 11 is entered into the aligned slot 15 for the member and pulled through the slot 15 until that part containing the resilient body 14 has passed through the slot 15, when the resilient body 14 can return to its unstressed state to resiliently retain the member 11 with the rotary member 16 without tension in member 11. When both flexible members 11 have been so located so as to be anchored with the rotary member 16 the rotary member 16 is rotated, by manually displacing the lever 20, until the lever 20 can enter the keep 21 and the keep in 22 can be inserted in keep 21 to maintain said lever 20 within keep 21. As with the FIGS. 1, 2 and 3 embodiment such rotation of the rotary member 16 causes both members 11 to be partially wound onto the rotary member 16, thereby simultaneously tensioning said members and the flexible wall 17.

It will be appreciated that the flexible side wall for a vehicle can have a substantial length, to maintain uniform tension on the wall using conventional straps and buckles a strap and buckle arrangement is generally provided for each foot length of the lower region of the flexible wall and, to achieve the same results, a flexible wall 17 may have 20, 30 or even 40 flexible members 11 attached thereto. To tension the flexible wall 17 each and every one of the flexible members 11 must be located in a slot 15 in a rotary member 16, it is possible to provide a single rotary member 16 capable of receiving all the flexible members 11 along the lower edge of the flexible wall 17 but the tension to be borne by such an arrangement would be substantial and, if the tension is to be applied by an operator working a single lever, some gearing arrangement would be necessary. In an alternative, and preferred, embodiment a plurality of rotary members 16 are arranged along the vehicle part 18 in axial alignment and each rotary member 16 is arranged to accommodate a number of flexible members 11 which can be comfortably tensioned by an operator.

It will be appreciated that when the rotary member 16 has substantial strength it is not necessary to provide individual slots 15 for the flexible members 11 and the rotary member 16 may provide one or more slots each capable of receiving two or more flexible members 11. It will be appreciated that the rotary member 16 need not be a solid of revolution and may, for example, comprise two rails extending in side-by-side relationship and defining the slot 15 therebetween.

Whilst the resilient body 14, having been passed through a slot 15 and allowed to expand to its undeformed configuration, will anchor a member 11 the member 11 can easily be removed from the rotary member 16 by simply pulling the flexible member 11 in the plane of the slot 15, when the resilient member 14 will deform to allow said member to be drawn outwardly from the slot 15, thus to release the lower edge regions of the flexible wall 17 to allow said lower regions to be elevated during loading of the vehicle.

The tensioning arrangement described above in accordance with the present invention affords the following advantages:

(1) As a plurality of flexible members 11 can be individually anchored to the respective rotary members without tension, or with minimum tension, all the flexible members 11 along the lower edge of a flexible wall can be anchored in any desired order before any one of said members 11 is placed in tension. Thus facility is particularly advantageous in windly conditions.

(2) When a resilient member 14 is passed through its respective slot and, with minimum tension in the flexible member 11, engages the underside of the slot 15, the rigid element 13 is accurately located within the slot 15 to lock the flexible member 11 with the rotary member 16 until slot 15 is rotated from the tension plane of the members 11.

(3) When the flexible members 11 are of equal length and their respective rigid inserts 13 and resilient inserts 14 are identically located, rotation of the rotary member 16 applies equal tension to all the flexible members 11 anchored to that rotary member.

(4) When a plurality of rotary members 16 are provided to accommodate the flexible members 11 along one side wall of a vehicle said rotary member 16 can be rotated, to tension its associated members 11 and the flexible wall 17 attached thereto, in any desired order, again a useful advantage in windy conditions.

(5) When all the members have been wound onto their respective rotary members 16 the lower edge region of the flexible wall 17 has been drawn downwardly substantially outwardly of the free end of each member 11 so that there are no protrusions or loose strap ends externally of the vehicle as can affect the performance of the vehicle and the flexible members are substantially protected from the elements.

In the embodiment illustrated in FIGS. 5 and 6 and which embodiment has the form of a winch, a rotary member, generally indicated by reference numeral 51, comprises a solid cylinder 52 with a slot 53 extending axially therethrough but terminating short of the ends of the said cylinder 52. A ratchet wheel 54 is secured on one end of the cylinder 52, as by welding 55, and a ratchet wheel 56 is secured on the other end of the cylinder 52, again as by welding (not shown). A tubular member 57 is secured to the radial end of the cylinder 52 exposed through the ratchet wheel 54, the axis of the cylinder 52 passes through the axis of the tubular member 57, and the axis of member 57 lies substantially at right angles to the axis of the cylinder 52.

The ratchet wheels 54 and 56 are so secured to the cylinder 52 that the pawl engaging faces 54a, 56a respectively of said ratchet wheels 54 and 56 lie in common planes, passing through the axis of the cylinder 52, and face in the same circumferential direction.

The cylinder 52 is contained within a generally U-shaped housing, the ends of which housing are closed by end walls 59 and 60 which provide bearings for the cylinder 52 and the ratchet wheels 54 and 56 lie outwardly of said end walls 59 and 60 respectively.

The upper regions 61 of the housing 58 (as viewed in FIG. 6) are open to allow a flexible member 62 (shown in broken line in FIG. 6) to be engaged with the cylinder 52.

A pivot pin 63 is rotatably supported in bearings presented by end walls 59 and 60 and the ends of the pin 63, outwardly from the end walls 59 and 60, are secured to the limbs 64 and 65, of a U-shaped pawl bar, the limbs 64 and 65 lie parallel to their adjacent end walls 59 and 60 respectively, and the bridge 66 of the pawl bar connects the limbs 64 and 65 at such spacing from the pivot pin 63 that said bridge 66 can be manually engaged and displaced when the upper regions of housing 58, remote from the pivot pin 63, lie between the limbs 64 and 65.

The limb 64 presents an abutment face 64a, engageable selectively with the pawl engaging faces 54a of sprocket wheel 54, and the limb 65 presents an abutment face (not shown identical with the abutment face 64a on limb 64, and engageable with the pawl engaging faces 56a on the sprocket wheel 56. The abutment face 64a, and the corresponding abutment face on limb 65, lie in a common plane parallel to the rotational axis of the rotary member 51 and, due to the aligned relationship of the pawl engaging faces 54a and 56a, the abutment face on limb 65 will engage with a pawl engaging face 56a on ratchet wheel 56 when the abutment face 64a on limb 64 engages a pawl engaging face 54a of ratchet wheel 54.

The housing 58 may be secured to a rigid member (not shown) by screws or bolts engaged with holes 67 in the housing 58 but in another arrangement the housing 58 may be secured to an undersurface, for example the undersurface of the load bearing platform of a vehicle, with an opening in the said platform exposing the open upper regions 61 of the housing 58 and the housing 58 may be secured to the platform by screws or bolts in tapped bores 68 in the upper regions of the end walls 59 and 60.

When the housing 58 is secured to an undersurface by screws or bolts engaged with the tapped bore 58 the limbs 64 and 65 of the U-shaped pawl bar may be bent, at or adjacent a mid-region, as shown in broken line in FIG. 6 so that the pawl bar can be readily displaced manually to the disengaged position illustrated in FIG. 6 without interference from the said undersurface.

The winch arrangement illustrated in FIGS. 5 and 6 operates as follows:

With the pawl bar 64, 65, 66 lifted (as viewed in FIG. 6) so the abutment face 64a is disengaged from the ratchet wheel 54 and the corresponding abutment face on limb 65 is disengaged from the ratchet wheel 56 the rotary member 51 may be rotated, by hand, until the plane of the slot 53 is substantially vertical (as viewed in FIG. 6) to allow the free end of the flexible member 62 to be passed downwardly through the open upper regions 61 of housing 58 and passed into the slot 53. The flexible member 62 will, in accordance with the present invention, include a rigid element substantially identical with the element 13, and may also include a resilient body, identical with the body 14, and which body when passed downwardly through said slot resiliently retains the flexible member 62 with cylinder 52 and, as hereinbefore described, locates the resilient member within the slot 53.

The flexible member 62 is then tensioned by simply locating a hand lever 69 in the bore of the tubular member 57 and manually rotating the rotary member 51 anti-clockwise, as viewed in FIG. 6. With the pawl bar 64, 65, 66 released, so that under gravity the limbs 64 and 65 engage the peripheries of the respective ratchet wheels 54 and 56, the rotary member 51 can rotate anti-clockwise without interference but immediately the manual tension on the hand lever is released so that the tension in member 62 urges clockwise rotation of the rotary member 51 the abutment face 54a, and the corresponding abutment face on limb 65, engage with the first oncoming pawl engaging faces 54a and 56a respectively of the clockwise rotating ratchet wheels 54 and 56 to prevent further clockwise rotation of the rotary body 51. Thus, the body 51 is locked against clockwise rotation and the member 62 is maintained under the imparted tension.

To release the member 62 it is only necessary to elevate the bridge 66 of the pawl bar 64, 65, 66, to cause said bar to rotate clockwise, as viewed in FIG. 6 whereupon the abutment face 64a and the corresponding abutment face on limb 65, are disengaged from the ratchet wheels 54 and 56, thus releasing the rotary member 51 for clockwise rotation and, of course, if the member 62 is under substantial tension, the rotation of the rotary member 51 may be controlled by re-inserting the manual lever 69 into the member 57 and allowing the clockwise rotation of rotary member 51 to proceed under manual control.

Whilst the present invention has been described by way of example with reference to specific embodiments many modifications and variations will be apparent to persons skilled in the art and by way of example the flexible members 11 may be dispensed with and the lower edge of the flexible wall 17 provided with a resilient insert 14 and a rigid element 13 so that the lower edge of the sheet 17 is located directly into a continuous slot 15 in a rotary member 16, in which case the flexible wall 17 acts in identical manner to the flexible members 11 and is wrapped onto the rotary body 16 during tensioning.

I claim:

1. A tensioning apparatus for tensioning a flexible member anchored at one end comprising, in combination, a rotary member arranged for rotation about an axis parallel to the intended plane of tension for the flexible member and at right angles to the intended direction of tensioning, manually operable means for rotating said rotary member to wind said flexible member onto said rotary member to tension said flexible member, locking means for locking said rotary member with the flexible member under tension, a slot of uniform length and width dimensions through said rotary member extending and a rigid element no longer than the length of the slot secured to the flexible member to be tensioned and, wherein, the slot has such width as to allow the free end of the flexible member to be entered thereinto and drawn through the rotary member until the rigid element lies within said slot, and said rigid element has such length, in the direction of its insertion into the slot, and the slot has such depth, that the rigid element is locked in the slot when the plane of the slot is rotated through more than 90° from the intended plane of tension for the flexible member and the said flexible member is in tension.

2. A tensioning apparatus as claimed in claim 1 and wherein said flexible member comprises two panels secured together in face-to-face relationship and the said rigid element lies between said panels.

3. A tensioning apparatus as claimed in claim 1 and wherein the said slot in the rotary member has such length in the direction of the axis of the rotary member as to be capable of receiving more than one flexible member therein when said flexible members are spaced apart in the length direction of the said slot, and each said flexible member includes a rigid element engageable in the said slot, whereupon the rotary member can tension said flexible members simultaneously.

4. A tensioning apparatus as claimed in claim 1 and wherein the said rotary member has a plurality of slots spaced apart in the direction of the axis of said member, each said slot being capable of receiving one or more flexible members with their respective rigid elements, and whereby the said rotary member can tension the plurality of flexible members simultaneously.

5. A tensioning apparatus as claimed in claim 1 and wherein the said manually operable means for rotating the rotary member comprise a radial lever fixed with, or detachably secured to, the said rotary member.

6. A tensioning apparatus as claimed in claim 5 and wherein the means for locking the said rotary member with the flexible member in tension comprise a keep engageable with said radial lever.

7. A tensioning apparatus as claimed in claim 1 and wherein the rotary member has a ratchet wheel secured for rotation therewith and the said locking means for locking the rotary member with the flexible member in tension comprise a pawl engageable with said ratchet wheel.

8. A tensioning apparatus as claimed in claim 1 and wherein the flexible member includes a resilient body adjacent the rigid element and towards the free end of the flexible member so as to precede the rigid element when the flexible member is being inserted into the said slot in the rotary member, the resilient body having such dimensions as to be resiliently deformed in passage through the slot whereupon on clearing said slot, the resilient member adopts its normal shape and configuration to retain the flexible member with the rotary member.

9. A tensioning apparatus as claimed in claim 1 and wherein the rotary member is contained within a housing, open at one side extending in the direction of the axis of the rotary member to allow the flexible member to be engaged with the rotary member, said housing providing bearings for the rotary member, and said housing being adapted for securement to a fixed location.

10. A tensioning apparatus as claimed in any preceding claim for tensioning a flexible panel closure for an aperture and wherein the said flexible panel is anchored along its upper length region to a fixed member defining the upper length regions of said aperture, characterized in that the rotary member of the tensioning apparatus is rotatably supported by a member defining the lower length regions of the aperture and is rotatable about an axis parallel to said lower length regions of said aperture.

* * * * *